United States Patent [19]
Williams et al.

[11] Patent Number: 4,671,308
[45] Date of Patent: Jun. 9, 1987

[54] FIRE-SAFE BALL VALVE

[75] Inventors: Peter C. Williams, Cleveland Heights; Ulrich H. Koch, Bainbridge Township, Ross County; Timothy J. Francis, Stow, all of Ohio

[73] Assignee: Whitey Co., Highland Heights, Ohio

[21] Appl. No.: 758,832

[22] Filed: Jul. 24, 1985

Related U.S. Application Data

[63] Continuation of Ser. No. 434,248, Oct. 14, 1982, abandoned.

[51] Int. Cl.$^4$ ............................................. F16K 17/14
[52] U.S. Cl. ........................................ 137/72; 137/74; 251/174; 251/315; 251/317
[58] Field of Search ........................................ 251/368

[56] References Cited

U.S. PATENT DOCUMENTS

| | | | |
|---|---|---|---|
| 2,860,896 | 11/1958 | Naumann | 277/134 |
| 3,066,909 | 12/1962 | Reed | 251/317 X |
| 3,394,915 | 7/1968 | Gaonot | 251/315 X |
| 3,428,292 | 2/1969 | Scaramucci | 251/315 X |
| 3,567,176 | 3/1971 | Johnson | 251/174 |
| 3,592,440 | 7/1971 | McFarland | 251/174 X |
| 3,677,514 | 7/1972 | Mencarelli | 251/174 X |
| 3,712,585 | 1/1973 | Grenier | 251/174 |
| 3,894,718 | 7/1975 | Koch | 251/172 X |
| 4,006,881 | 2/1977 | Gaillard | 251/315 X |
| 4,373,543 | 2/1983 | Brown | 137/74 |
| 4,410,165 | 10/1983 | Koch | 251/172 |

FOREIGN PATENT DOCUMENTS

| | | | |
|---|---|---|---|
| 729128 | 12/1942 | Fed. Rep. of Germany | 277/134 |
| 2065276 | 6/1981 | United Kingdom | 251/315 |
| 1595256 | 8/1981 | United Kingdom | 137/72 |

*Primary Examiner*—Harold W. Weakley
*Attorney, Agent, or Firm*—Fay, Sharpe, Beall, Fagan, Minnich & McKee

[57] ABSTRACT

An improved, soft-seated fire-safe ball valve is disclosed. The ball valve includes a body having a central passageway, a ball member positioned in the passageway, and a pair of radially inwardly extending shoulders in the passageway disposed circumferentially thereof on opposite sides of the ball member. The ball member includes a fluid flow opening therethrough and is mounted for selective rotation between valve open and closed positions to control fluid flow through the valve. An improved seat assembly is provided comprising a rigid reinforcing ring, an elastic seat ring supported by the reinforcing ring and configured for fluid sealing engagement to the ball member, and a deformable, heat resistant secondary seat ring interposed between the elastic seat ring and an associated one of the pair of shoulders. Also, a weir ring may be advantageously received in the seat ring. Upon fire damage to the elastic seat ring, the secondary seat ring engages the ball member to seal the valve. The weir ring inhibits extrusion of a substantial portion of the seat ring such that the seat assembly operates to maintain a fluid-tight seal upon partial destruction of the elastic seat ring.

11 Claims, 14 Drawing Figures

FIG. 6
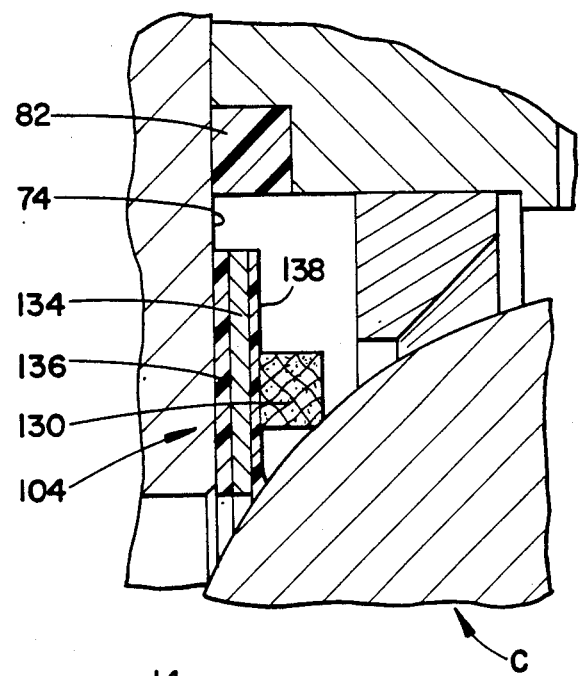
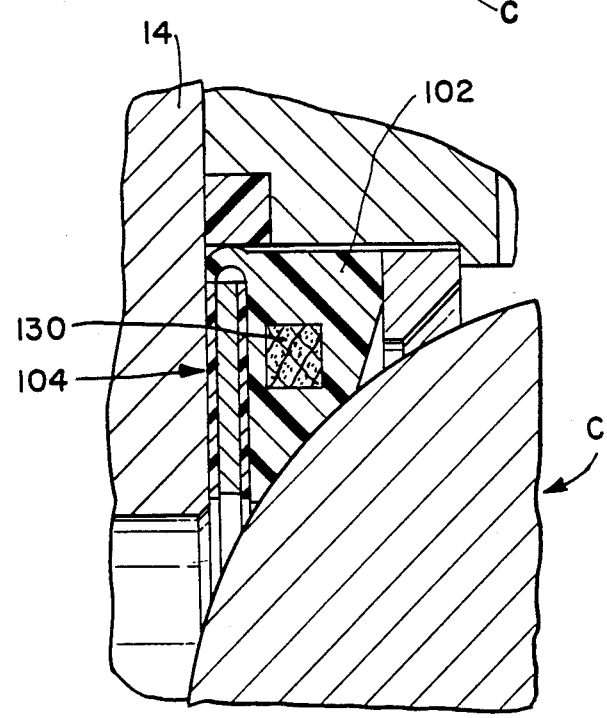
FIG. 14

FIRE-SAFE BALL VALVE

This application is a continuation of application Ser. No. 434,248, filed Oct. 14, 1982, now abandoned.

BACKGROUND OF THE INVENTION

This invention relates to the valve art, and, more particularly, to fire-resistant or fire-safe ball valves.

When employed in the valve art, the term "fire-safe" has come to mean a valve that satisfies certain specified conditions when subjected to a fire. See Arant, *Fire-Safe Valves—An Overview,* Proceedings, Thirty-Sixth Annual Symposium on Instrumentation for the Process Industries (Texas A&M University, 1981). Unfortunately, different sets of conditions have been promulgated by different organizations and the valve industry has not yet recognized a uniform standard. Basically, according to one of the standards (American Petroleum Institute 607), if a valve will substantially maintain a fluid seal in a closed position at a valve body temperature of at least 1100 degrees F. for at least ten minutes, it may be certified as "fire-safe". Valves which include design characteristics to resist leakage upon exposure to fire but cannot meet this standard are commonly referred to as "fire-resistant".

The invention is particularly applicable to a new and improved soft-seated fire-safe ball valve and seat assembly for a valve of the type having a so-called "floating ball" and will be described with particular reference thereto. However, it will become readily apparent to those skilled in the art that the invention is capable of broader applications and could be adapted for use in other types and styles of valves.

Ball valve constructions in commercial use typically employ annular seats or seat rings formed of a resilient and deformable plastic such as Teflon (a registered trademark of E. I. duPont de Nemours and company) for sealing engagement with the ball. A pair of such seat rings are positioned adjacent the valve inlet and outlet openings. The ball itself is mounted for a slight amount of free movement or shifting axially of the seats when the ball is in a valve closed position under fluid pressure conditions. Such shifting causes the ball to act against and to flex and deform the downstream seat ring to enhance its sealing engagement with the ball. The amount of such flexing varies in accordance with the fluid pressure involved.

When subjected to a fire, the soft annular seat of a conventional floating ball type of ball valve is substantially damaged by the heat of the fire to the extent that leakage through the valve may become unacceptable. Typically, downstream of the ball, the sequence of seat destruction is such that the plastic first softens and begins to flow out or extrude through the valve port. Continued exposure to excessive heat ultimately causes the seat to char and sublimate or evaporate. The destruction of the plastic seat allows the ball to further shift under fluid pressure conditions until the ball engages a secondary seat. Such a secondary seat typically comprises a metal or non-flammable radially inwardly extending projection of the valve body, such as a support shoulder for the plastic seat. Normally, such a surface is not specially designed for a high degree sealing engagement against the ball and allows substantial leakage.

Another particular problem occurs where the plastic seat is only partially destroyd by a fire. For example, where a valve is exposed to radiant heat from a fire on one side only, or in a low intensity fire, only that portion of the valve seat nearest the fire may soften and extrude into the valve port. The ball may then shift under fluid pressure toward that area made available to it by the extrusion and, being unable to evenly contact the secondary seat, expose a large leak path. Alternatively, the ball may be held back from making any contact with the secondary seat by the undestroyed portions of the plastic seat and similarly expose large leak paths. Under either situation fluid may rush through the leak paths and quench the valve. The quenching action operates to prevent further deterioration of the seat in spite of a continuing fire and typically maintains a massive leak through the valve.

An additional but often unrecognized problem which occurs during a fire is the rapid increase in fluid pressure by heated fluid which is trapped between the inlet and outlet seats around the ball. The heat of the fire may heat and even vaporize such fluid in the center of the valve between the seats. Often the fire is so intense that the fluid is so rapidly vaporized that it cannot escape past the seats quickly enough to prevent an excessive increase of pressure within the valve. Such an increase in pressure can easily exceed the valve rating and rupture the seals at the stem packing and the body joints, or rupture the valve body itself.

Another practical problem occurs when a fire hose is trained upon a valve in a volatile liquid system that has been heated by a fire. The quick-cooling action of the hose water causes a violent condensation of heated vapor in the valve that dislodges the ball and churns up char, waste and contaminants that may become lodged between the ball and the ball sealing surface and thereby provide additional leak paths.

One overall objective of fire-resistant or fire-safe ball valve seat designs is to obtain a valve which will seal with conventional valve seat materials at normal operating conditions and will also seal when subjected to a fire. Various forms and types of ball valve seat designs have heretofore been suggested and employed in the industry for purposes of obtaining a fire-safe or fire-resistant ball valve, all with varying degrees of success. It has been found that the defects present in most prior fire-safe or fire-resistant ball valve designs are such that the devices themselves are of limited economic and practical value.

A common type of fire-resistant ball valve design includes a primary soft seat of a plastic material such as Teflon, and a secondary seat of metal or a high temperature composite material to seal the valve upon destruction of the primary seat in a fire. The secondary seat typically comprises a metal rim or washer interposed between the soft plastic primary seat and a valve body support shoulder. This design suffers from the problems naturally resulting from any type of metal-to-metal seal. Since the ball in a floating ball type valve is never perfectly spherical and the secondary metal seat is not made perfectly circular, leakage across the secondary seal after destruction by fire of the primary seal is usually high, as the ball cannot make a full annular contact with the metal seat. For a metal-to-metal seal to be anywhere near leak-tight in a fire-safe or other application, the sealing surfaces must be match lapped or burnished, one into the other. Since such a procedure is very expensive, match lapping is an economically impractical procedure for a manufacturer of fire-safe or fire-resistant ball valves. In addition, a match-fitted secondary seat would likely be marred by the hazards and consequences of normal valve operation, such as corrosion, pitting, scaling, erosion and the like, to the extent that during a subsequent fire the advantages of match fitting would have been lost. Ball valve designs incorporating the secondary metal seat or high temperature composite seat also suffer from the problems of partial deterioration and quenching of the primary seat and the problems of loose and blocking char and waste materials associated with quick cooling.

A suggested improvement over the mere metal secondary seat design has been to add a secondary seat comprised of a heat resistant material which is more deformable and resiliant than metal. Typically, carbon or graphite rings have been used. While such designs may provide improved operation when new, it has been found that such designs are particularly susceptible to damage in normal service. Normal wear through cycling the valve, erosion while opening, or abrasion by foreign matter can easily damage the secondary seat materials since they are typically brittle and of low strength compared to a normal plastic seat. Therefore, such designs usually still include a metal lip or rim as a final or tertiary seat to restrict leakage if the secondary seat is damaged. Such a multiplicity of seats increases the size, complexity, and cost of the valve without adding a reliable redundant seal. Whatever elements of wear, erosion or other foreign matter might damage one of the seats is likely to damage all of the seats since they are all equally exposed during normal service.

One alternate suggestion for obtaining a fire-safe valve is to include packing a conventional valve in enough insulation to insulate the valve for a sufficient amount of time to obtain a fire-safe rating. Another suggestion is to dispose a sprinkler near the valve which will quench the valve during a fire. Both of these designs are unsuitable for practical cost reasons in that they would involve expensive installations and maintenance. In addition, an insulated valve would suffer from the problem of uncertainty as to whether the insulation would be properly reattached or installed each time the valve received maintenance.

It has, therefore, been desired to develop a fire-safe ball valve and seat assembly which would satisfactorily operate at normal operating conditions and also seal the valve in a valve closed position upon exposure to a fire. Preferably, such a design would eliminate the necessity for utilizing costly sprinklers or insulation packings to protect the valve.

The present invention contemplates a new and improved construction which overcomes all of the above referred to problems and others and provides a new and improved fire-safe floating ball type valve and soft seat assembly which provides improved sealing capabilities and effectively resists leakage upon exposure to any realistic fire. The invention further contemplates being useful with a wide variety of seat designs and materials which effectively seal at a wide variety of normal operating conditions.

BRIEF DESCRIPTION OF THE INVENTION

Generally, the present invention contemplates a new and improved fire-safe ball valve and seat assembly wherein a composite seat member assembly includes a primary soft plastic seat member or ring, and a secondary seat member of deformable, heat resistant material. The secondary seat member operates to seal the valve upon partial or complete destruction or deterioration of the primary seat ring caused by fire or other extreme heat. A pair of such asssemblies are disposed on opposite sides of the ball member and are continuously urged toward the ball for maintaining it properly positioned in a valve body and for providing valve sealing.

More specifically, the subject invention is particularly applicable to use in a valve of the type having a valve body with a central passageway and a ball member which includes a fluid flow opening positioned in the passageway. The ball is mounted for selective rotation between valve open and closed positions to control fluid flow through the valve. A pair of radially inward extending shoulders are disposed circumferentially of the passageway on opposite sides of, and in a facing relationship with, the ball member. The passageway includes a pair of counterbores disposed on opposite sides of the ball member with each of the counterbores having an inner end wall facing an associated one of the shoulders. A pair of composite seat assemblies are positioned axially in the passageway on opposite sides of the ball member for fluid sealing engagement with the ball member. Each of the assemblies includes a reinforcing ring, a primary seat member comprising a soft plastic seat ring and a secondary seat member. The reinforcing ring includes a central opening and abuts an associated one of the counterbore end walls. The soft seat ring is adapted for rotational type flexure generally toward and away from the reinforcing ring and abuts the reinforcing ring opposite to the counterbore end wall. The seat ring includes a central opening and a ball-engaging surface facing the ball member for sealing engagement with the ball member. The secondary seat member is interposed between the seat ring and an associated one of the shoulders. The secondary seat member comprises a deformable, heat resistant secondary seat ring which preferably includes expanded carbonaceous material whereby upon fire damage to the seat ring, the secondary seat ring engages the ball to seal the valve.

In accordance with another aspect of the present invention, the secondary seat member comprises a disc spring in combination with a sheet of expanded carbonaceous material. The disc spring has a generally frusto-conical configuration in an unstressed condition. The sheet of expanded carbonaceous material is generally radially coextensive with the disc spring and is interposed at least between the spring and the primary soft plastic seat ring. The disc spring operates to continuously urge the facing sheet of carbonaceous material and the soft seat ring toward the ball member. Upon damage to the primary seat ring by a fire, the facing sheet of carbonaceous material contacts the ball member to effect fluid sealing.

In accordance with yet another aspect of the invention, the secondary seat member includes a pair of sheets of expanded carbonaceous material. The pair sandwich the disc spring and are generally radially coextensive therewith. A first sheet faces the ball member for engagement with the ball member upon damage to the primary soft seat ring. A second sheet faces the associated one of the pair of the radially inward extending shoulders for sealing engagement with the shoulder upon damage to the primary seat ring.

According to a further aspect of the invention, a weir ring is included in the primary seat ring and is interposed generally between the primary seat ring and the secondary seat member.

According to another aspect of the present invention, the ball member includes a second opening normal to the principal fluid flow opening of the ball member. The second opening faces the valve inlet when the ball is in the closed position to communicate fluid contained in the center of the valve to the inlet fluid.

The principal object of the invention is the provision of a new and improved fire-safe ball valve and seat assembly which has improved fluid sealing characteristics upon fire or heat exposure to the valve.

Another object of the present invention is the provision of such a ball valve and seat assembly which will avoid metal-to-metal fluid sealing engagements.

Still another object of the invention is the provision of a ball valve which will maintain fluid sealing upon partial or complete destruction by fire of a primary soft plastic seat member.

Yet another object of the invention is the provision of a ball valve seat assembly which will prevent the interposition of primary seat ring extrusions or fire-caused char and contaminants between the ball member and ball engaging and sealing surfaces.

Another object is the provision of a secondary seat which will function upon fire damage to the ball valve regardless of the design and construction material of the primary seat.

Still another object is the provision of a secondary seat which will not deteriorate with age in normal service.

Another object is the provision of a fire-safe ball valve which prevents the accumulation of destructively high pressures within the valve body and seat assemblies when the valve is exposed to high temperatures.

Still another object is the provision of a ball valve seat assembly which includes a secondary seat that is removed from the deterioration and wear forces of fluid flow associated with normal service.

Still other objects and advantages of the invention will become apparent to those skilled in the art upon a reading and understanding of the following specification.

BRIEF DESCRIPTION OF THE DRAWINGS

The invention may take physical form in certain parts and arrangements of parts, a preferred and several alternative embodiments of which will be described in detail in this specification and illustrated in the accompanying drawings which form a part hereof and wherein:

FIG. 6 is a cross-sectional view similar to FIGS. 4 and 5 where the soft plastic seat has been completely destroyed;

FIG. 14 is an enlarged cross-sectional view of another alternative seat assembly embodiment which incorporates the invention.

DETAILED DESCRIPTION OF THE PREFERRED EMBODIMENT

Figure 1:
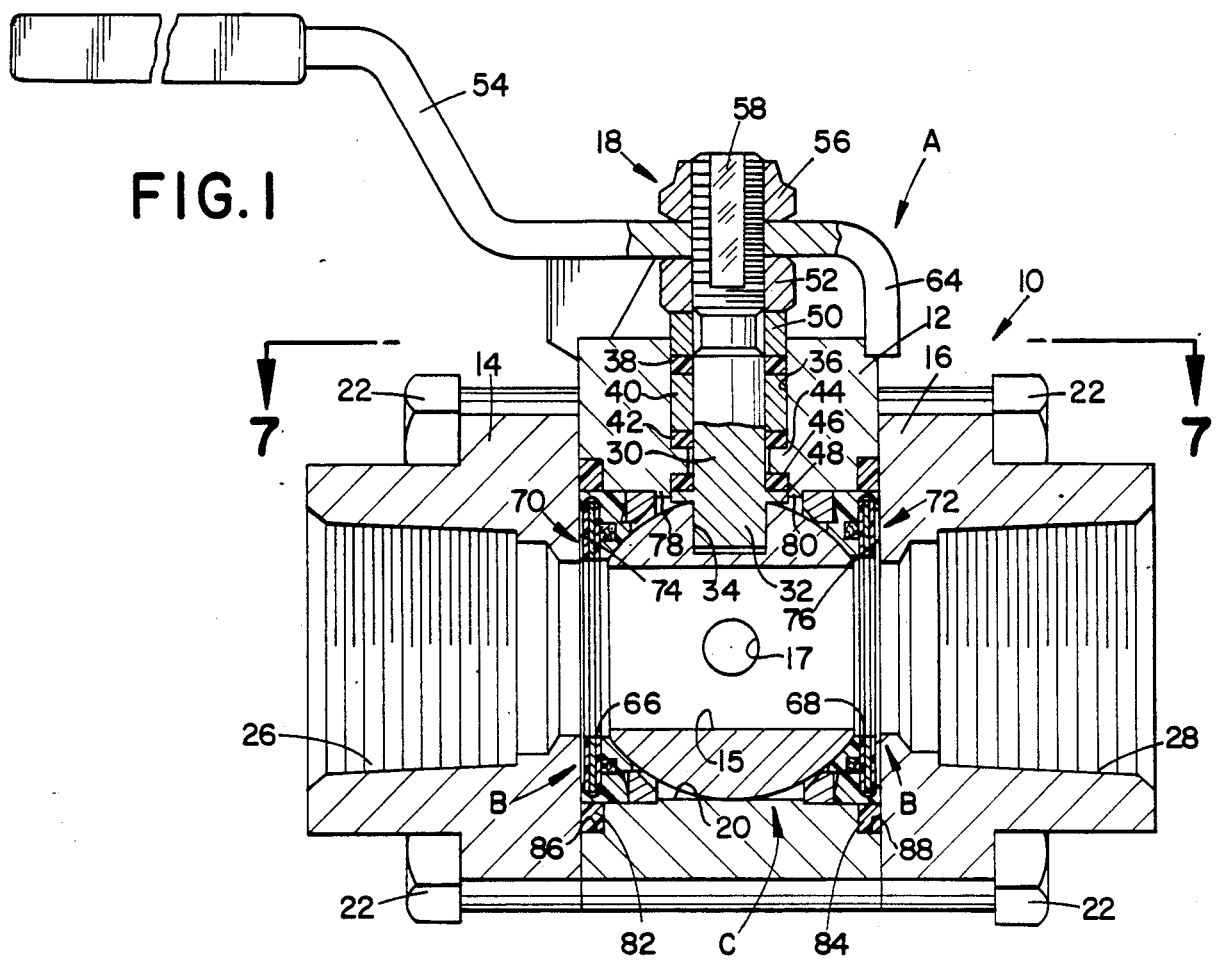
FIG. 1 is a longitudinal cross-sectional view through a ball valve which incorporates the preferred embodiment of the invention.

Referring now to the drawings wherein the showings are for purposes of illustrating the preferred and several alternative embodiments of the invention only and not for purposes of limiting the same, FIG. 1 shows a ball valve A having a pair of opposed seat assemblies B disposed on opposite sides of a floating type spherical ball member C.

Figure 7:
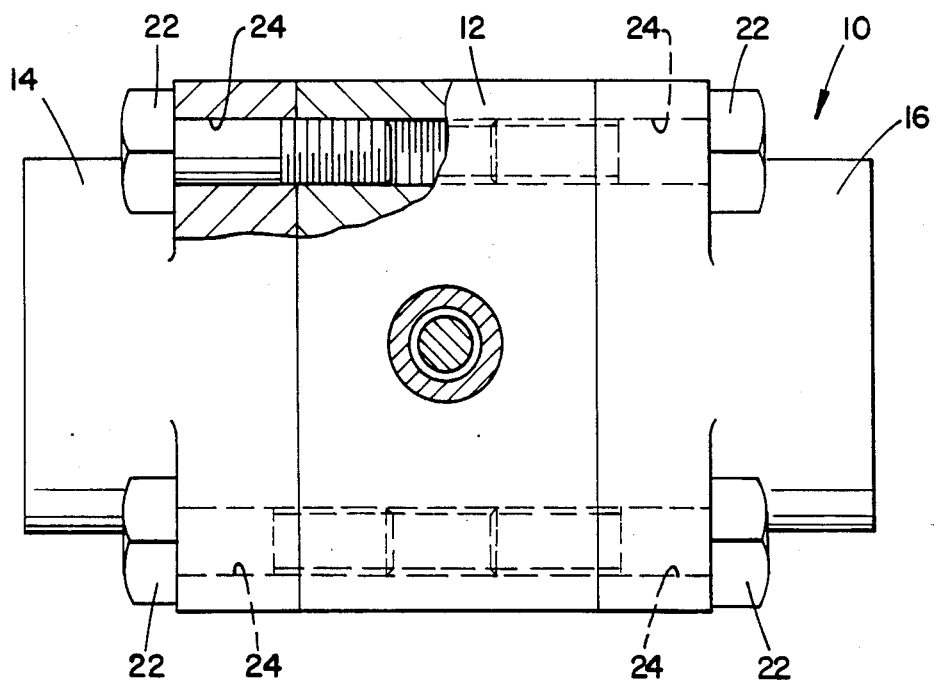
FIG. 7 is a substantially plan view of the valve taken along lines 7—7 of FIG. 1 with a portion of the valve body broken away for showing an improved bolting arrangement.

More particularly, and with reference to FIGS. 1 and 7, ball valve A includes a body or housing generally designated 10 having a main or central body section 12 and opposed end fittings 14,16. Seat assemblies B and ball C are mounted within the main body section 12 and the ball member is arranged for selective rotation by a stem and actuating handle assembly generally designated 18. Ball member C includes a first or principal fluid flow opening 15 extending the diameter of the ball for communicating fluid flow from the inlet to the outlet when the valve is in a valve-open condition. A second opening 17 is included in the ball C normal to the principal flow opening 15 and generally facing the valve inlet when the valve is in a closed position to communicate fluid and fluid pressure in the center of the valve to the valve inlet fluid. Substantially all of the details of the portions of the valve illustrated in FIG. 1, except for the seat ring assemblies, may be modified as desired and/or necessary to accommodate different types or styles of ball valve constructions.

In general, however, and for purposes of describing the subject invention, the valve body includes a generally cylindrical central passageway or axially-extending fluid flow opening 20 which is only slightly larger in diameter than ball member C. Each of end fittings 14,16 is releasably connected to central body section 12 by a plurality of longitudinally extending tie bolts generally designated 22 received through bolt bores designated 24 of opposed end fittings 14,16 and fittedly received in main body section 12 (FIG. 7). It has been found that the use of a plurality of tie bolts 22 received in main body section 12 is particularly advantageous for a fire-safe application to avoid the problems of yielding or breaking of longer tie bolts which may occur after a valve has been heated in a fire and rapidly cooled with water from a fire hose or sprinkler. During a fire, the metal components of the valve will naturally expand upon being heated. When a fireman has trained a hose on such a heated valve, the periphery of the valve, including the tie bolts, will cool and will contract more quickly than the body of the valve. Such quick cooling and contraction may ultimately result in yielding or breaking of the tie bolts 22. Where a plurality of shorter, fitted tie bolts are employed, such problems are minimized. The end fittings 14,16 are also provided with internal threads 26,28 or any other convenient means to accommodate connecting the valve to an associated fluid system or piping.

The stem and actuating handle assembly 18 illustrated includes a stem member 30 having a lower end 32 configured as shown for sliding receipt in a slot or groove 34 included in the upper end of ball C. This arrangement allows the ball to be rotated between valve open and closed positions while, at the same time, permitting the ball to have some freedom of movement for shifting axially in valve body passageway 20 when the valve is in a closed position and fluid pressure is acting on the ball.

Stem member 30 extends outwardly through an opening 36 in central body section 12. Packing rings 38,40,42 suitable for elevated temperatures are positioned in opening 36 and sealingly engage the opening and stem member 30. As shown, lower packing ring 42 rests upon an inwardly extending flange 44 formed within opening 36. A thrust washer 46 suitable for elevated temperatures is positioned below flange 44 and is clamped thereto by an outwardly extending shoulder or flange 48 formed at the base of stem member 30. The stem is held in position by a packing gland 50 and a packing nut 52. As shown in FIG. 1, tightening of packing nut 52 applies a compressive force to packing rings 38,40,42 to effect radial expansion into a fluid-tight seal about the stem.

Although it is possible to actuate the valve stem by many different types of actuators, including both manual, mechanical or automatic, a handle member 54 has been shown. This handle is releasably secured to stem member 30 by a nut 56 which clamps the handle to the top of packing nut 52. A cooperating flat 58 is advantageously formed on the exterior of the stem for association with a flat (not shown) in the handle opening for properly positioning the handle on the stem. However, the position of the handle and, in turn, the position of ball member C are limited by depending stop members 62,64, carried by handle 54. These stop members engage suitable surfaces on central body section 12 to provide fixed stops for the valve in the full open and full closed positions.

With continued reference to FIG. 1, the ball seat arrangement utilized in the subject invention includes a pair of seat ring assemblies B disposed on opposite sides of ball member C. As shown, the seat ring assemblies are clampingly retained in position on opposite sides of the ball adjacent opposite ends of the main body section passageway 20. The seat ring assemblies are located substantially equidistant from and on diametrically opposite sides of the axis rotation of the ball member and include cental openings 6,68. While the seat ring assemblies could be maintained in position by many different or alternative arrangements, they are shown as being located by shoulders 70,72 defined by end faces 74,76 of end fittings 14,16, respectively. The inward limit of movement of the seat ring assemblies is defined by a pair of shoulders or steps 78,80 which are formed by the inner end walls of counterbores extending inwardly of valve body passageway 20.

Still further, a seal is provided between central bod section 12 and end fittings 14,16 by means of sealing rings 82,84 which are received in second counterbores 86,88, respectively. Each sealing ring is disposed about the outer circumference or outer peripheral surface of a portion of the associated seat ring assembly B. The sealing rings are preferably constructed of a deformable, resilient, heat resistant and thermally stable material such as an expanded carbonaceous material and wire mesh composite to avoid problems of sublimation and charring that may occur such as when a conventional type thermoplastic O-ring seal is exposed to a fire or other elevated temperatures. In the preferred construction, Grafoil (a registered trademark of the Union Carbide Corporation) has been advantageously employed as the deformable and heat resistant material. However, it will be appreciated that other materals such as asbestos or ceramic composites could also be employed. As the valve main body section 12 and opposed end fittings 14, 16 expand and contract upon heating and cooling during and after a fire, sealing rings 82,84 continue to provide a satisfactory seal between the central body section and the end fittings.

The structural details of ball valve A as described hereinabove are with reference to the preferred valve construction. It will be readily apparent to those skilled in the art, however, that modifications may readily be made thereto to accommodate particular operational needs and/or requirements. Such changes are not deemed to affect the overall intent or scope of the present invention as will be described in detail hereinafter.

Figure 2:
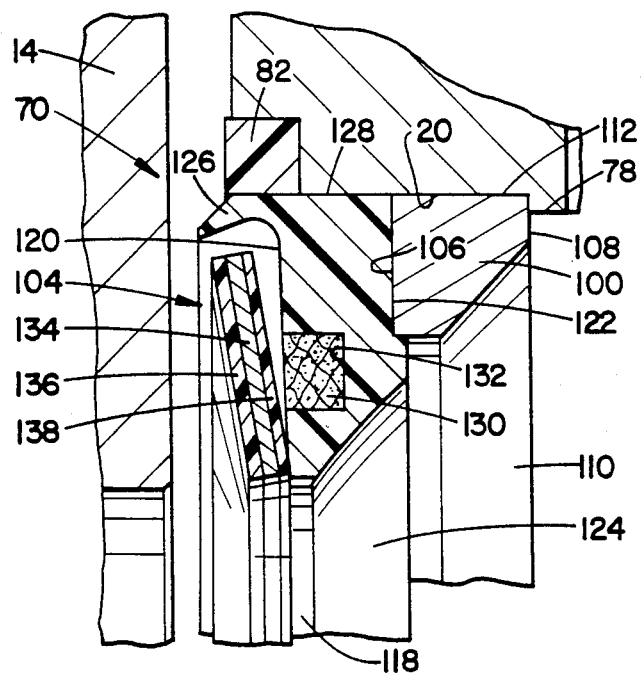
FIG. 2 is an enlarged cross-sectional view of a portion of the downstream seat assembly of FIG. 1 just prior to valve makeup and with the ball member deleted for ease of illustration.
Figure 3:
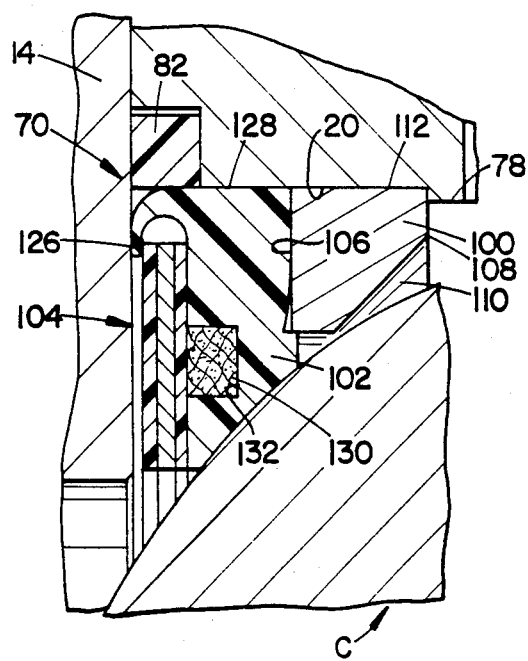
FIG. 3 is an enlarged cross-sectional view of a portion of the downstream seat assembly of FIG. 1, but with the valve in a closed position under the influence of elevated fluid system pressures.
Figure 4:
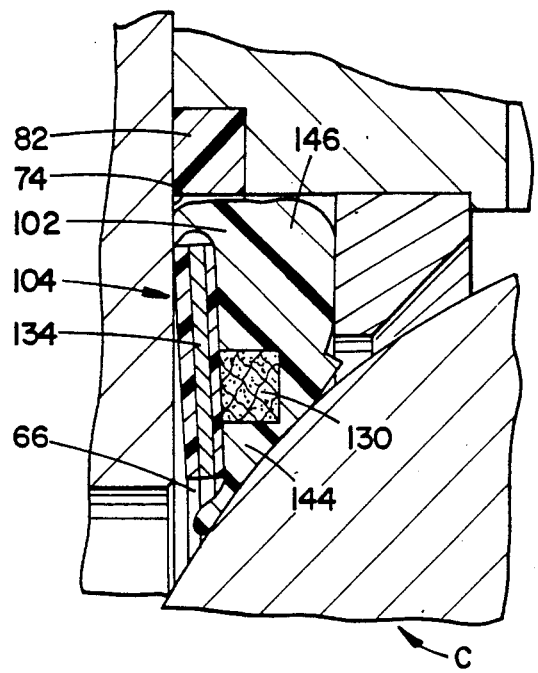
FIG. 4 is a cross-sectional view similar to FIG. 3 but with the valve having been exposed to fire and heat such that the soft plastic seat ring has begun to flow outwardly through the valve port.
Figure 5:
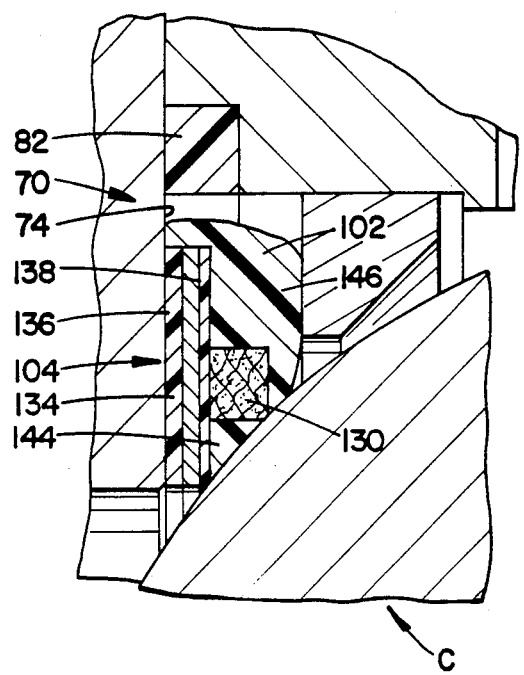
FIG. 5 is a cross-sectional view similar to FIG. 4 where the ball has made contact with the secondary seat.
Figure 13:
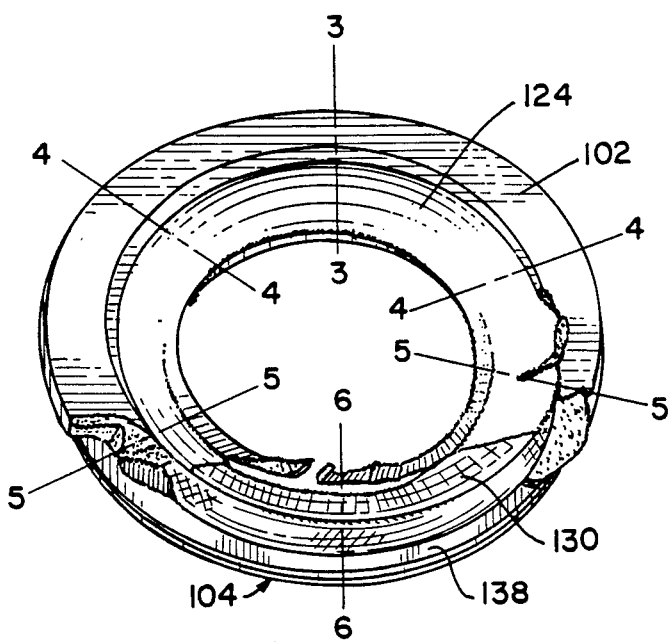
FIG. 13 is an enlarged perspective view of the seat assembly of FIG. 1 after partial destruction upon exposure to a fire and having been removed from the valve body for ease of illustration.

With references to FIGS. 2 through 6 and 13, description will be made of the specific details of seat assemblies B comprising the preferred embodiment of the invention. FIG. 2 shows a cross-sectional view of the downstream seat assembly disposed adjacent end fitting 14 prior to valve makeup. The ball member C has been deleted for ease of understanding and appreciating the seat assembly construction. FIG. 3 shows a view of the seat assembly of FIG. 2 at valve makeup and with the valve in a closed position under the influence of elevated fluid system pressure. FIGS. 4, 5 and 6 illustrate the seat assembly B at successive stages after the valve has been exposed to a fire. FIG. 4 shows a primary soft plastic seat ring which has begun to heat flow and extrude out through the valve port. FIG. 5 shows the valve after the ball has made contact with the secondary seat. FIG. 6 shows the valve after the primary soft plastic seat ring has been completely destroyed and extruded or evaporated out of the valve body. FIG. 13 shows the seat assembly B after partial destruction such as where the valve is exposed to a fire or radiant heat on one side only. Lines 3—3, 4—4, 5—5, and 6—6 of FIG. 13 correspond to the cross-sectional views of the seat assembly B shown in FIGS. 3, 4, 5, and 6, respectively.

With particular reference to FIGS. 2 and 3, the seat assemblies B are preferably comprised of three components, i.e., a reinforcing or support ring 100, a primary seat member 102 comprising a soft plastic seat ring, and a secondary seat member 104 comprising a deformable, non heat-flowing seat ring. Although only a portion of one seat assembly is shown in these FIGURES, it will be appreciated that the other seat assembly is identical thereto unless otherwise specifically noted. Reinforcing ring 100 has an annular configuration including a central opening and is constructed from a rigid material such as steel or other suitable metal. A first circumferentially continuous surface or end face 106 of the ring faces associated shoulder 70 of end fitting 1. A second continuous surface 108 faces and abuts counterbore end wall or step 78 of main body section passageway 20 to positively establish a forwardmost or home position for the reinforcing ring. A third continuous surface 110 faces generally toward the ball member, but is dimensioned to be spaced therefrom in order to prevent any abutment or interference therewith and to inhibit distortion and displacement of the associated primary seat ring 102 between the reinforcing ring third surface 110 and the ball member. The outer circumference of peripheral surface 112 of ring 100 is closely disposed to the side wall of passageway 20. Outer surface 112 and second surface 108 may alternately include a flange or step configured and dimensioned to engage shoulder 78 to further extend portions of support ring 100 axially inward of passageway 20 where overall valve dimensions may so require. However, such an additional flange is deleted from the embodiment shown to obviate additional machining steps.

With continued reference to FIGS. 2 and 3, it will be seen that primary seat member 102 also comprises an annular or ring-like member having a central opening 118 which is smaller in size than the central opening of the reinforcing ring 100. The primary seat member preferably comprises a soft plastic seat ring and is adapted for flexure generally toward and away from the reinforcing ring 100. Seat ring 102 is configured to exert a spring-like mechanical elasticity against the ball member. A first surface 120 generally faces the associated shoulder 70 of end fitting 14. Seat ring second surface 122 faces reinforcing ring 100 for bearing engagement and support against reinforcing ring first surface 106. Seat ring third surface or ball engaging surface 124 generally faces ball member C for fluid sealing engagement therewith. Flange or lip 126 extends axially outward of seat ring first surface 120 at outer peripheral surface 128. Lip 126 is preferably continuous about the seat ring and located so its radial inner surface generally corresponds to the outside diameter of secondary seat member 104. Flange or lip 126 is further beveled at the radial outermost area thereof and is slightly rolled over the radial outer edges of the secondary seat member in the manner shown. While not necessary, this arrangement advantageously maintains the primary seat and secondary seat members together as a subassembly. Preferably, seat ring 102 is constructed from a soft resilient plastic material such as Teflon, polyethylene or the like. It should be readily appreciated, however, that a wide range of other types of material such as acetal resins and the like or even soft metals and ceramic composites could also be advantageously utilized. The particular material chosen will, to some extent, be dependent upon the normal operating conditions to which the valve will be subjected.

Included in primary seat ring 102 is a weir ring 130. Preferably, this ring is received in an annular undercut or groove 132 of seat ring 102 isolated from the valve fluid flow passageway. However, it is within the scope of the invention that weir ring 130 could be completely encased in seat ring 102 (FIG. 14) or, alternatively, completely without the seat ring such as, for example, an axially directed lip of the secondary seat member 104 extending towards the ball member at the inner diameter of the primary seat ring 102. Preferably, though, weir ring 130 is generally disposed radially intermediate of seat ring 102 between the asociated secondary seat member 104 and ball member C. In this preferred location, the weir ring 130 is isolated from exposure to the same hazards of wear and damage that affect the soft primary seat member 102 in normal service. The weir ring is constructed of a thermally stable, non heat-flowing material, preferably a Grafoil and wire mesh composite, similar to sealing rings 82,84; however, mere Grafoil itself, wire mesh, a ceramic or even metal may be suitably employed.

Secondary seat member 104 comprises a subassembly including a central frusto-conical disc spring 134 sandwiched between a first annular facing sheet 136 facing associated shoulder 70 and a second annular facing sheet 138 facing primary seat member 102. Facing sheets 136,138 are preferably constructed of Grafoil and are generally radially coextensive with disc spring 134; however, it is within the scope of the invention that the facing sheets 136, 138 may extend only over a portion of the disc spring as, for example, where first facing sheet 136 may extend only over a portion of the disc spring 134 near the outer diameter of the disc spring, and second facing sheet 138 may extend over the portion near the inner diameter of the spring 134. The latter embodiment may be particularly economical and advantageous in large size ball valves.

It has further been found to be advantageous for the facing 74 of support shoulder 70 to be knurled or grooved for better gripping of disc spring facing sheet 136. Upon exposure of the valve to a fire, such improved gripping inhibits slipping, flowing or extrusion of the facing sheet and disc spring. It is possible at high temperatures for Grafoil to become somewhat flowable. The knurled or grooved facing inhibits such action and facilitates the fluid tight seal.

The diameter at the outer end of the secondary seat member 104 is such that the member may be received within the cylindrical cavity defined by the inner wall of the seat ring axial flange 126 and seat ring first surface 120. The inner diameter of the secondary seat member is slightly larger than the diameter of the central opening 118 of seat ring 102 to substantially isolate the secondary seat member from normal service contact with the ball member and system and associated wear and damage hazards.

Disc spring 134 is selected so that its force is sufficient under partial deflection to continuously urge the seat ring 102 towards the ball. The spring must also allow deflection thereof toward a flattened condition to accommodate ball shifting and engagement with seat ring third surface 124 during normal operating conditions. With particular reference to FIG. 3, it may be seen that a fluid-tight seal is effected by close containment of the primary seat ring 102 between the ball member C, the support ring 100, the valve main body 12, and the end fitting shoulder 70. During normal operating conditions, secondary seat member 104 primarily operates to bias and contain the primary seat ring 102 without performing a secondary sealing function.

With reference to FIGS. 1, 2 and 3, and at the time of valve make-up, each of the seat assemblies B is moved such that each primary seat ring 102 is slightly rotatably flexed away from the other generally about its outer periphery and against secondary seat member 104 in response to engagement between the seat ring ball-engaging surface 124 and ball member C. This action slightly compresses the associated disc spring 134 toward a flattened condition. In addition to positioning the ball member, this spring deflection assures a seal force between the two seat rings and ball at ball-engaging surface 124 regardless of how low the system pressure may be. The secondary vent orifice or opening 17 in the ball C faces the inlet when the valve is in a closed position and assures that the inlet seat does not seal. Any fluid in the center of the valve is free to expand upon heating or vaporizing, and relieve through the vent orifice 17 without increasing the pressure in the valve.

OPERATION

With particular reference to FIGS. 4, 5, 6, 12 and 13, the operation of the above described preferred embodiment will be specifically discussed upon destruction of the primary seat by fire.

FIG. 4 shows the soft plastic seat ring 102 being heated to a more fluid state and, in turn, flowing or being extruded through the central opening 66 of the secondary seat member 104 by fluid pressure forces in the valve. Upon softening of the seat ring 102 the disc spring 134 of the secondary seat member 104 deflects to maintain a fluid tight seal against ball member C and against end face 74 of shoulder 70.

With particular reference to FIG. 5, ball member C has shifted axially downstream in valve A to compress the secondary seat member 104 and to abut the weir ring 130. Second facing sheet 138 which is sandwiched between disc spring 134 and seat ring 102 contacts ball member C at its radially innermost portion to effect a fluid-tight seal. Since second facing sheet 138 is preferably constructed of a heat-resistant, deformable material such as Grafoil, the sheet will conform to the engaging surface of the ball member C and thereby avoid the problems of prior fire-safe ball valve designs which incorporate metal-to-metal type secondary seals. Similarly, first facing sheet 136 of secondary seat member 104 engages support shoulder 70 at shoulder end wall 74 at its radially outermost portion to effect a fluid-tight seal. The deformable property of sheet 136 enables it to conform to the irregularities of surface 74 and the outermost radial edge of disc spring 134.

It is within the scope of the invention to include a secondary seat member 104 without a first or second facing sheet 136, 138 because it has been found that the disc spring 134, due to its circumferential elasticity, will form an appreciable metal-to-metal seal with ball member C, thereby overcoming the problems resulting from the ball member not being perfectly spherical nor match-lapped with the secondary seat member.

The disc spring 134 of the secondary seat member possesses a circumferential elasticity as well as an axial elasticity and upon softening of the seat ring 102, the secondary seat member deflects to maintain a fluid-tight seal between the ball member C and the end face 74 of shoulder 70. By circumferential elasticity is meant the capability of the secondary seat member to deflect axially in one segment more so than in another segment.

Since the ball member C is not perfectly spherical and central opening 66 of disc spring 134 is not perfectly round, the ball and spring will contact not only at a few high spots. The circumferential elasticity of disc spring 134 enables it to deflect at those high spots such that the ball makes essentially continuous contact against the innermost radial edge of disc spring 134. Similarly, the outermost radial edge of disc spring 134 contacts end face 74 only at a few high spots. The circumferential elasticity of disc spring 134 again enables it to deflect by variable amounts around its perimeter and thereby establish an essentially continuous line of contact between the outermost radial edge of disc spring 134 and end face 74 of shoulder 70. Thus, the circumferential elasticity of the disc spring 134 compensates for imperfections in roundness at the inner and outer radial edges of disc spring 134, imperfections in sphericity of ball member C, and deviations from flatness of end face 74 of shoulder 70.

The weir ring 130 acts as a "weir" or dam to prevent excessive extrusion of the softening plastic seat 102 between the ball member C and the secondary seat member 104 into the valve port. As a practical matter, a fire cannot always be expected to uniformly heat the surface of a fire-safe valve, particularly where the fire is a radiative fire near the valve and heats the closer side of the valve, but not the opposite side. Thus, in the course of a fire, it is reasonably foreseeable that the plastic seat ring 102 will likely soften in only a first portion on its circular perimeter prior to softening in other areas. Without the weir ring 130, the first portion may excessively extrude into the valve port under system pressure allowing the ball member C to displace radially or sideways perpendicular to the valve port access. Consequently, as the ball member C moves downstream through softening plastic to meet the secondary seat member 104, the ball may shift too far to one side and may contact the secondary seat member 104 unevenly, leaving large gaps and leak paths where melting plastic and system fluids can blow through. It has been observed that such leak paths and gaps occur at positions generally spaced ninety degrees from the vector of direction of radial shift. The point one hundred eighty degrees from the vector of radial shift maintains a fluid seal by contact with the remainder of the primary plastic seat 102. The rush of system fluids may then quench the plastic seat 102 preventing further melting. A gross leak thus developed can remain a gross leak no matter how much extra fire is applied to the fire-safe valve.

Figure 12:
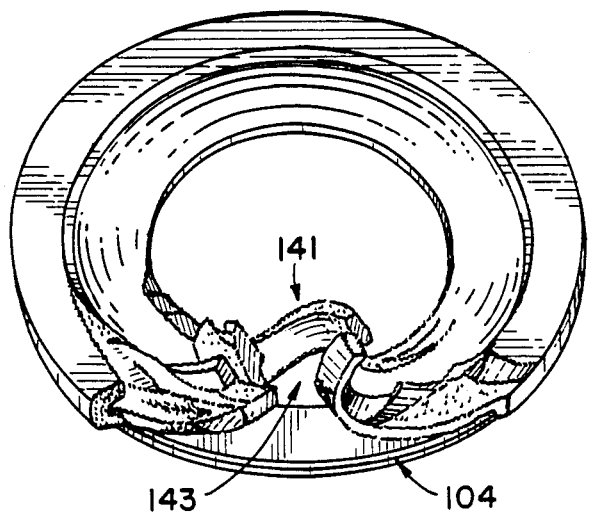
FIG. 12 is an enlarged perspective view of the seat assembly of FIG. 10 after partial destruction upon exposure to a fire and having been removed from the valve body for ease of illustration.

An additional mechanism of partial seat destruction is illustrated in FIG. 12. A seat assembly which does not include a weir ring is shown which has been exposed to fire that has caused only a portion 141 to extrude into the valve port. A large leak path 143 has resulted due to the inability of the ball member to contact the secondary seat member 104. The ball member C is checked against any radial or axial shift into the extruded portion by the substantially remaining portion of the primary plastic seat ring 102. The quenching action of the rushing leak quenches the primary plastic seat ring against further destruction or extrusion in spite of varying fire intensity.

However, with reference to FIG. 5, weir ring 130 constrains the flow of soft and melting plastic no matter where on the seat perimeter plastic softening first occurs. Weir ring 130 is positioned in seat ring 102 such that only a narrow annulus portion 144 may extrude into the valve port. the substantial portion 146 of seat ring 102 is blocked from extruded flow by the weir ring 130. The relatively small portion 144 which may extrude is of little substance and upon its extrusion, the associated displacement area into which the ball member C may then shift is insufficient to allow formation of a leak path. It is also preferable that weir ring 130 be placed in seat ring 102 such that ball member C contacts the weir ring 130 simultaneously with contact of the secondary seat member 104. Weir ring 130, thus, can further contribute to effecting a secondary seal upon destruction of the primary seat member 102.

With reference to FIG. 6, the primary seat member 102 has been completely destroyed such that the substantial portion 146 (FIG. 5) of the soft plastic seat ring has been sublimated or evaporated out through the valve port. A fluid-tight seal remains between ball member C and secondary seat member 104 as the ball member remains in contact with the radially innermost portion of the second facing sheet 138 which deforms in accordance with the ball member surface. First facing sheet 136 similarly engages shoulder end wall 74 to maintain the fluid seal between the secondary seat member 104 and the shoulder 70. In addition, it is advantageous that weir ring 130 be sized to engage the ball member upon destruction of the primary seat member and associated downstream shifting of the ball. Such engagement facilitates a further fluid seal.

With particular attention to FIG. 13, along lines 6—6 it may be seen that the ball has contacted the weir ring 130 after destruction of the primary seat member and has also contacted the secondary seat member to maintain a fluid seal (FIG. 6). Along lines 5—5, the extrusion of the substantial portion of the primary seat member is blocked by weir ring 130 to prevent the formation of the leak path in FIG. 12.

Figure 8:
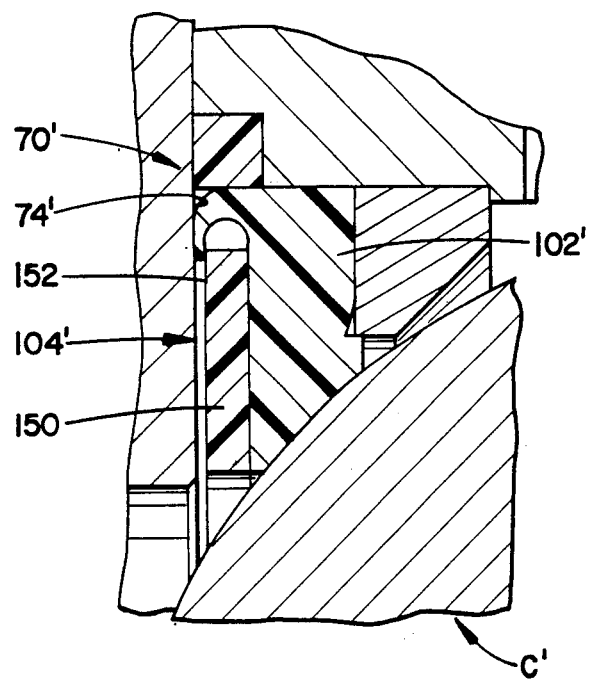
FIG. 8 is an enlarged cross-sectional view of a seat assembly which incorporates an alternative embodiment of the invention.

With particular reference to FIG. 8, an alternative embodiment of the present invention is shown. For ease of illustration and appreciation of this alternative, like components are identified by like numerals with a primed (') suffix and new components are identified by new numerals. Secondary seat member 104' comprises a unitary disc member 150 of heat resistant, deformable material such as Grafoil or a Grafoil and wire mesh composite. Upon fire damage to the primary seat member 102', ball member C' may shift axially downstream in response to fluid pressure to engage the radially innermost end portion of secondary seat member 104' to effect a fluid-tight seal. Further, wall 74' which is preferably knurled, engages end face 152 of the secondary seat member to effect a fluid-tight seal between the secondary seat member and support shoulder 70'. secondary seat member 104' may thereby conform to the engaging surface of the ball C' and the wall 74'.

Figure 9:
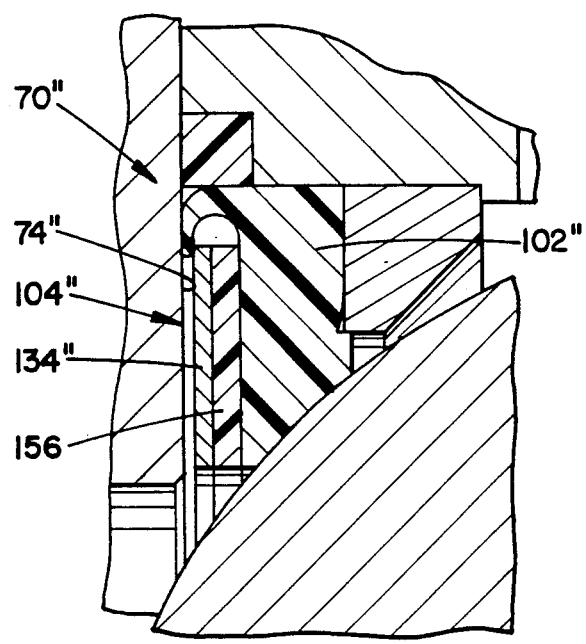
FIG. 9 is an enlarged cross-sectional view of yet another alternative embodiment of the invention.

Yet another alternative embodiment of the invention is illustrated in FIG. 9 where like components are identified by like numerals with a double primed (") suffix. Secondary seat member 104" comprises a disc spring 134" and a facing sheet 156 of heat resistant, deformable material such as Grafoil or Grafoil and wire mesh composite. Upon destruction of the primary seat member 102" in a fire, the ball member in a closed position advances under system pressure against the secondary seat member 104" and contorts the facing sheet 156 at its radially innermost portion to make a fluid-tight seal. Furthermore, as the fire progresses, disc spring 134" anneals. The softening disc spring, contorted by the ball under pressure, thereby more readily conforms to the surface 74" of support shoulder 70" and makes an improved metal-to-metal seal behind the spring. Yet another embodiment of the invention similar to this embodiment would comprise use of a single facing sheet on the disc spring surface facing the support shoulder. Such a construction would involve a metal-to-metal secondary seal to the ball and a facing sheet to shoulder seal. It is preferable to employ a knurled shoulder to contact the facing sheet.

Figure 10:
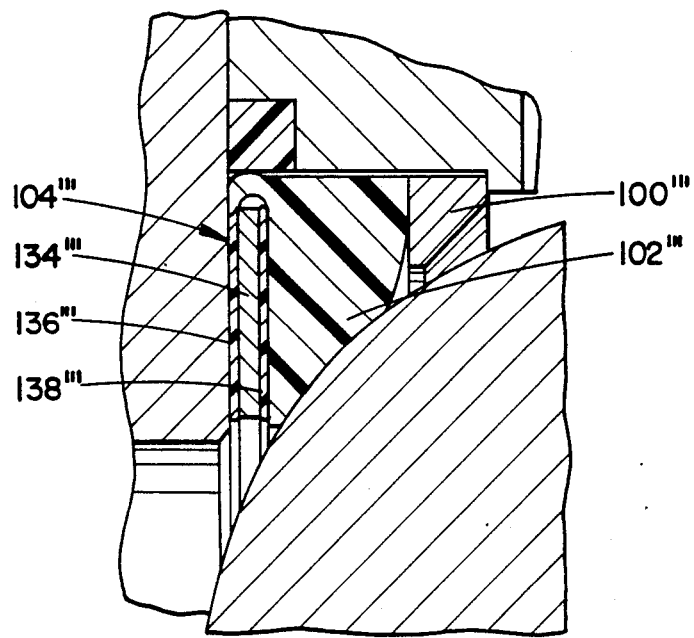
FIG. 10 is an enlarged cross-sectional view of a seat assembly of a ball valve which incorporates another alternative embodiment of the invention.

FIG. 10 shows another alternative embodiment of the present invention where like components are identified by like numerals with a triple primed ('") suffix. This embodiment of the invention includes a seat assembly comprising support ring 100'", a primary seat member or seat ring 102'", a secondary seat member 104'" including a disc spring 134'", a first facing sheet 136'" and a second facing sheet 138'". Facing sheets 136'", 138'" are constructed of Grafoil or other heat resistant, deformable material. A weir ring is not included. Upon estruction of seat ring 102'"in a fire, the ball member will shift axially downstream and make a fluid seal at second facing sheet 138'". First facing sheet 136'" engages knurled end wall 74'" of support shoulder 70'" to maintain the seal.

Figure 11:
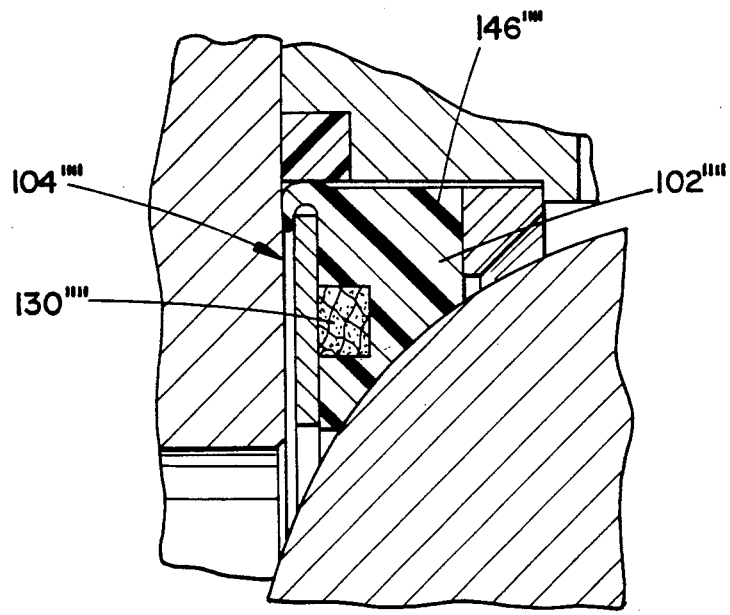
FIG. 11 is an enlarged cross-sectional view of still another alternative seat assembly embodiment which incorporates the invention.

Finally, FIG. 11 relates to still another alternative embodiment of the present invention wherein like components are again identified by like numerals with a primed suffix. Secondary seat member 104"" may comprise a single disc spring, a single non heat-flowing deformable disc constructed of material such as Grafoil or a metal wire and Grafoil mesh composite, or a combination of a disc spring and a Grafoil facing sheet similar to the secondary seat member 104" illustrated in FIG. 9. A weir ring 130"", preferably constructed of a Grafoil and wire mesh composite, is included in primary seat member 102"" to contact the ball member upon partial or total destruction of the primary seat member, and to block extrusion of the substantial portion 146"" of the seat ring 102"".

Other modifications not specifically shown in the drawings may be readily incorporated into seat ring assemblies B without in any way departing from the overall invention. It may, for example, be desirable to slightly modify the relative dimensional characteristics between the primary seat members, reinforcing rings and secondary seat members to accommodate particular operational requirements.

The invention has been described with reference to a preferred and several alternative embodiments. Obviously, modifications and alterations will occur to others upon a reading and understanding of this specification. It is our intention to include all such modifications and alterations insofar as they come within the scope of the appended claims or the equivalents thereof.

What is claimed is:
1. A fire safe ball valve comprising:
a body having a central passageway;
a ball member including a fluid flow opening therethrough, said ball member being positioned in said passageway and mounted for selective rotation between valve open and closed positons to control fluid flow through said valve;
a pair of radially inward extending shoulders in said passageway disposed circumferentially thereof on opposite sides of said ball member;
a pair of composite seal assemblies positioned axially in said passageway on opposite sides of said ball member for fluid-sealing engagement with said ball member, each of said seat assemblies comprising:
a soft, primary seat ring adapted for elastic flexure, said seat ring including a central opening and a ball-engaging surface facing said ball member for sealing engagement with said ball member;
a secondary seat member including a disc spring having a central opening and a generally frusto-conical configuration in an unstressed condition interposed between said seat ring and said associated one of said shoulders and including at least one annular sheet of expanded carbonaceous material disposed between said primary seat ring and said disc spring, said secondary seat member being spaced from the ball member by said seat ring, and said annular sheet of expanded carbonaceous material being disposed in substantial isolation from said central opening of the associated seat ring to prevent substantial exposure of said sheet to valve normal operational wear hazards; and, a weir ring means formed of a thermally stable, non heat-flowing material located in at least one of said pair of composite seat assemblies for inhibiting extrusion of said seat ring upon exposure of said valve to elevated temperatures and for limiting shifting of said ball member upon destruction of said seat ring, said weir ring means being disposed in a recess in said associated seat ring at a location spaced radially outwardly of said central opening and having a face in engagement with said associated secondary seat member, said weir ring means further having a circumferentially extending surface in said associated seat ring at a location relative to said secondary seat member and said ball member such that in the event of limited destruction of the ball engaging surface of said seat ring at least a portion of said circumferentially extending surface of said weir ring means engages said ball member at about the same time as said ball member engages with a corresponding portion of said secondary seat member to limit ball member shifting to an extent to allow for sealing engagement between said secondary seat member and said ball member upon destruction of said primary seat ring.

2. The valve as defined in claim 1 wherein said ball member and pair of seat assemblies are sized so that when assembled, said seat ring and secondary seat member of each assembly are flexed and stressed to urge said seat ring toward contact with said ball member.

3. The valve as defined in claim 2 wherein said at least one sheet comprises first and second sheets disposed at the opposite faces of said disc spring and being radially coextensive therewith.

4. The valve as defined in claim 3 wherein said first sheet contacts the associated one of said shoulders for fluid sealing engagement therewith.

5. The valve as defined in claim 1 wherein said pair of radially inward extending shoulders include knurled surfaces for engagement with said secondary seat member.

6. The valve as defined in claim 1 wherein said pair of radially inward extending shoulders are secured to said body with a plurality of fastener members received by said body.

7. The valve as defined in claim 1 wherein said ball member further includes means for relieving pressure increases in said valve body due to fluid heating and vaporization upon exposure of said valve to elevated temperatures.

8. The valve as defined in claim 7 wherein said relieving means comprises a vent orifice disposed normally to said fluid flow opening to face a fluid inlet opening of said valve upon closure of said valve.

9. The valve as defined in claim 1 wherein said weir ring is positioned in said one seat assembly in substantial isolation from said central opening of the associated seat ring for preventing exposure of said weir ring to valve normal operational wear hazards at least a portion of said seat ring being disposed intermediate said weir ring and said ball member.

10. the valve as defined in claim 1 wherein said at least one annular sheet of expanded carbonaceous material is interposed between said seat ring and said disc spring.

11. The valve as defined in claim 1 wherein said at least one annular sheet of expanded carbonaceous material is interposed between said disc spring and an associated one of said pair of radially inward extending shoulders.

* * * * *